United States Patent [19]

Kosarew et al.

[11] Patent Number: 6,049,637
[45] Date of Patent: *Apr. 11, 2000

[54] SYSTEM AND METHOD FOR AUTOMATED DATA CAPTURE OF SEQUENTIAL FORM NUMBERS AT A COLLATOR/PRESS ASSEMBLY MACHINE USING AN OPTICAL READER WHICH DOES NOT CAPTURE AN IMAGE OF THE FORM NUMBER

[75] Inventors: W. Tony Kosarew, Centerville; Wendell B. Halbrook, Jr., Waynesville, both of Ohio

[73] Assignee: NCR Corporation, Dayton, Ohio

[ * ] Notice: This patent issued on a continued prosecution application filed under 37 CFR 1.53(d), and is subject to the twenty year patent term provisions of 35 U.S.C. 154(a)(2).

[21] Appl. No.: 08/907,939

[22] Filed: Aug. 12, 1997

[51] Int. Cl.7 ...................................................... G06K 7/10
[52] U.S. Cl. .......................... 382/321; 382/306; 382/312; 358/473
[58] Field of Search ...................................... 707/505–508; 358/473–474; 364/469.01–469.04, 478.09, 471; 382/107, 321, 312–313, 317, 305–306, 209; 235/472.01–472.03; 101/483; 270/52.02; 700/221, 124–125; 709/202, 224, 227, 231

[56] References Cited

U.S. PATENT DOCUMENTS

| | | | |
|---|---|---|---|
| 5,033,725 | 7/1991 | Van Duursen | 270/52.02 |
| 5,067,088 | 11/1991 | Schneiderhan | 364/478.09 |
| 5,287,128 | 2/1994 | Doane et al. | 347/112 |
| 5,608,639 | 3/1997 | Twardowski et al. | 364/469.04 |
| 5,613,669 | 3/1997 | Grueninger | 270/52.06 |
| 5,915,089 | 6/1999 | Stevens et al. | 709/202 |

*Primary Examiner*—Leo H. Boudreau
*Assistant Examiner*—Ishrat Sherali
*Attorney, Agent, or Firm*—Charlene Stukenborg

[57] ABSTRACT

A system and method for automated data capture of sequential form numbers at a collator/press assembly machine is provided. The system of the present invention includes an optical reader, a conventional personal computer including generally available spreadsheet software, an optional printer and a standard form collator/press assembly machine.

7 Claims, 3 Drawing Sheets

| Date | Oper # | Start/End | Part | Form 1 | | Form 2 | | Form 3 | | Form 4 | |
|---|---|---|---|---|---|---|---|---|---|---|---|
| | | | | Number F1 | Mod | Number F2 | Mod | Number F3 | Mod | Number F4 | Mod |
| 9/11/96 | 134 | Start | 1 | 8382340013 | 3 | 8382340024 | 4 | 8382340035 | 5 | 8382340046 | 6 |
| 9/11/96 | 134 | Start | 2 | 8382340013 | 3 | 8382340024 | 4 | 8382340035 | 5 | 8382340046 | 6 |
| 9/11/96 | 134 | Start | 3 | 8382340013 | 3 | 8382340024 | 4 | 8382340035 | 5 | 8382340046 | 6 |
| 9/11/96 | 134 | Start | 4 | 8382340013 | 3 | 8382340024 | 4 | 8382340035 | 5 | 8382340046 | 6 |
| Form # Match | | ⇑ | ⇑ | Good | | Good | | Good | | Good | |
| 9/11/96 | 134 | End | 1 | 8382040015 | 5 | 8382040026 | 6 | 8382040030 | 0 | 8382040041 | 1 |
| 9/11/96 | 134 | End | 2 | 8382040015 | 5 | 8382040026 | 6 | 8382040030 | 0 | 8382040041 | 1 |
| 9/11/96 | 134 | End | 3 | 8382040015 | 5 | 8382040026 | 6 | 8382040030 | 0 | 8382040041 | 1 |
| 9/11/96 | 134 | End | 4 | 8382040015 | 5 | 8382040026 | 6 | 8382040030 | 0 | 8382040041 | 1 |
| Form # Match | | ⇑ | ⇑ | Good | | Good | | Good | | Good | |
| 9/11/96 | 123 | Start | 1 | 8381670010 | 0 | 8381670021 | 1 | 8381670032 | 2 | 8381670043 | 3 |
| 9/11/96 | 123 | Start | 2 | 8381670010 | 0 | 8381670021 | 1 | 8381670032 | 2 | 8381670043 | 3 |
| 9/11/96 | 123 | Start | 3 | 8381670010 | 0 | 8381670021 | 1 | 8381670032 | 2 | 8381670043 | 3 |
| 9/11/96 | 123 | Start | 4 | 8381670011 | 0 | 8381670021 | 1 | 8381670032 | 2 | 8381670043 | 3 |
| Form # Match | | ⇑ | ⇑ | Bad | | Good | | Good | | Good | |
| 9/11/96 | 134 | End | 1 | 8381660011 | 1 | 8381660022 | 2 | 8381660033 | 3 | 8381660044 | 4 |
| 9/11/96 | 134 | End | 2 | 8381660011 | 1 | 8381660022 | 2 | 8381660033 | 3 | 8381660044 | 4 |
| 9/11/96 | 134 | End | 3 | 8381660011 | 1 | 8381660022 | 2 | 8381660033 | 3 | 8381660044 | 4 |
| 9/11/96 | 134 | End | 4 | 8381660011 | 1 | 8381660022 | 2 | 8381660033 | 3 | 8381660044 | 4 |
| Form # Match | | ⇑ | ⇑ | Good | | Good | | Good | | Good | |

600

SYSTEM AND METHOD FOR AUTOMATED DATA CAPTURE OF SEQUENTIAL FORM NUMBERS AT A COLLATOR/PRESS ASSEMBLY MACHINE USING AN OPTICAL READER WHICH DOES NOT CAPTURE AN IMAGE OF THE FORM NUMBER

BACKGROUND OF THE INVENTION

The present invention relates to a system and method for automated data capture of sequential form numbers at a collator/press assembly machine.

Currently, multi-part forms are used to provide multiple copies of business information such as for shipping. Information is typed or written in pre-printed fields on the top form part and is transmitted to multiple underlying form parts which also include the same pre-printed fields as the top form. (For example, a multi-part shipping form may include a shipping receipt part, a shipping label part and a billing label part.) For tracking purposes, the multi-part forms often have a field containing a sequential form number. Each of the multiple parts of a form has the same form number, which differs from the form number of any other multi-part form.

Typically, multiple parts of the forms are printed separately (to allow for different colors, different printing on the back side, etc.). When the multiple parts of the forms are collated or otherwise assembled, it is desirable to check that each part of the form has the same sequential form number. However, some current systems to check the form numbers use expensive camera equipment which captures the image of each number on each part of the form. Such commercially available equipment generally is very expensive and requires complex systems. Other systems rely on an operator manually verifying that each part of the form has the same form number, and thus are subject to normal human error. Furthermore, the currently available systems do not provide for the storage or entry of this process check data into a computer-readable form such as a spreadsheet.

There is a need to provide a system and method for automated data capture of sequential form numbers at a collator/press assembly machine.

SUMMARY OF THE INVENTION

In accordance with the teachings of the present invention, a system and method for automated data capture of sequential form numbers at a collator/press assembly machine is provided.

It is an important feature of the present invention that the sequential form numbers to be read are not required to be OCR-type (Optical Character Recognition type) characters.

Another important feature of the present invention is that the system and method does not require expensive camera equipment to record the image of the numbers (characters).

Still another feature of the present invention is the automation of the form number checking process which avoids error associated with the current manual keying of numbers and manual checking for matches or mismatches.

Yet another feature of the present invention is that the process of scanning and recording form numbers provides a record for Quality Control, historical or post process analytical purposes.

It is accordingly an object of the present invention to provide a computer-based system and method which optically reads sequential forms numbers, checks whether each part of each form has the same sequential form number and indicates whether or not an error has occurred. Preferably, the system also calculates a check digit for each part of each form and compares the check digit as a further indication of whether each part of each form has the same sequential form number.

BRIEF DESCRIPTION OF THE DRAWINGS

Additional benefits and advantages of the present invention will become apparent to those skilled in the art to which this invention relates from the subsequent description of the preferred embodiments and the appended claims, taken in conjunction with the accompanying drawings, in which:

DETAILED DESCRIPTION OF THE PREFERRED EMBODIMENT

Figure 1:
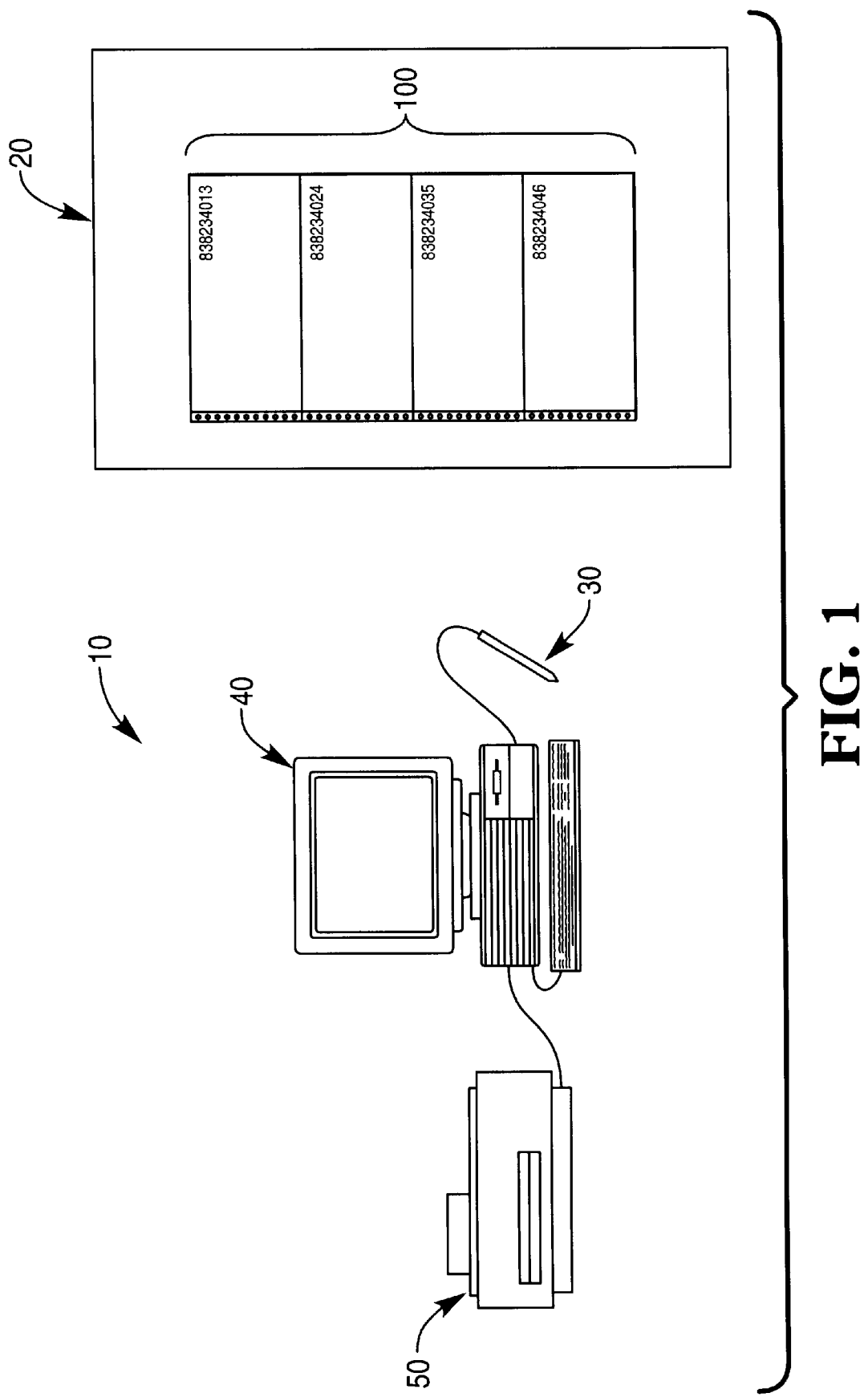
FIG. 1 is a block diagram of a system for automated data capture of sequential form numbers at a collator/press assembly machine of the present invention.

Referring now to the drawings, in which like-referenced characters indicate corresponding elements throughout the several views, attention is first drawn to FIG. 1 which shows a block diagram of a system for automated data capture of sequential form numbers at a collator/press assembly machine of the present invention. The system 10 of the present invention includes an optical reader 30, a conventional personal computer 40 including generally available spreadsheet software, an optional printer 50 and a standard form collator/press assembly machine 20.

In FIG. 1, collator/press assembly machine 20 is shown to include a batch 100 of four multi-part forms. Standard form collator/press assembly machine 20 may be any generic or custom-built assembly machine for generating multi-part forms from rolls of separately printed single layer forms. Business forms presses commonly used in the production of these products include: Hamilton, Harris and Muller Martini. Business forms collators commonly used in the production of these products include: Hamilton and Hamilton Jumbo Collators.

The personal computer 40 may be any microprocessor-based device having the memory, processing capabilities, software, etc. necessary for use in the present invention. The spreadsheet software for personal computer 40 may be Excel, available from Microsoft, Lotus, available from Borland, or any other spreadsheet software. The printer 50 may be any standard printer for generating reports from the system of the present invention.

The optical reader 30 is preferably a PRIMAX DATAPEN, which is a hand held text reader (available from PRIMAX manufactured in Taiwan). The optical reader 30 is programmed to accept numbers only and in this way limits any alpha characters that may be read accidentally. The reader 30 is not an OCR reader (an OCR reader requires that the type being read is either an OCR-A or OCR-B type face). The optical reader 30 can be programmed to accept any ASCII character in an eight (8) to twenty-two (22) point size. Thus, the optical reader 30 can read a full range of font types and designs including, but not limited to, OCR characters. The optical reader 30 can similarly be programmed to ignore any ASCII character (alpha or numeric) and in this way, limit any unwanted characters that may be read accidentally. Since an optical reader is used, a more complex and expensive photograph of each form number using camera equipment is not obtained. The optical reader 30 is connected to the personal computer 40 such as through a communications port.

Figure 2:
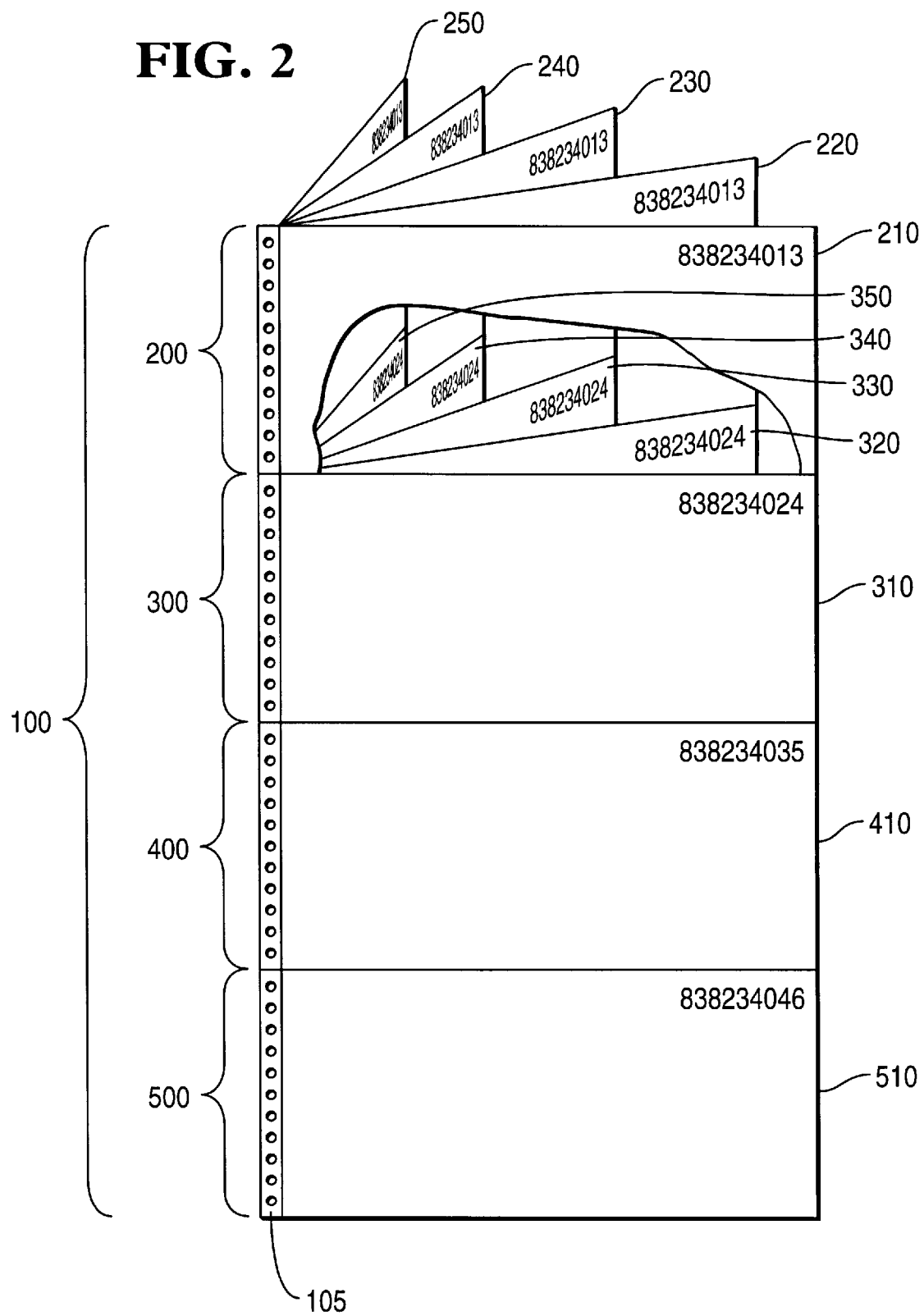
FIG. 2 shows a batch of multi-part forms for use in the system of FIG. 1.

FIG. 2 shows an expanded view of the forms 100 in the collator/press assembly machine 20. Each batch of forms 100 include a plurality of multi-part forms, four of which are shown in FIG. 2, indicated by reference numbers 200, 300, 400, 500. Representative multi-part form 200 includes five parts indicated by reference numbers 210, 220, 230, 240 and 250. Each of the five parts includes the same sequential form number, as indicated by the number "838234013" on each part of form 200. Similarly, multi-part form 300 includes five parts indicated by reference numbers 310, 320, 330, 340 and 350. Each of the five parts includes the same sequential form number, as indicated by the number "838234024" on each part of form 300.

Each part of the multi-part forms are preferably printed on a continuous roll and separated by perforations. Thus, first form part 210 of form 200 is printed on the same roll as first form part 310 of form 300.

In operation, the optical reader 30 is passed over the sequential numbers on the forms to be read located at the form collator/press assembly machine 20. First, each sequential number on the first form parts (210, 310, 410, 510) are read or scanned. Then the form (and/or the optical reader) is repositioned so each sequential number on the second form parts (220, 320, 420, 520) are read or scanned. This process is repeated until all the sequential numbers on each form part in the batch 100 are read or scanned. The personal computer 40 stores the sequential numbers as read and indicates whether the sequential numbers read from different parts of the same form are the same (indicating a GOOD form) or different (indicating a BAD form).

Figure 3:
FIG. 3 is a sample spreadsheet produced using the system of FIG. 1.

FIG. 3 shows an example of a spreadsheet 600 generated in accordance with the present invention. The spreadsheet indicates the number read or scanned from each of the parts of each multi-part form which are stored in cells in the spreadsheet after being read by the optical reader. If any of the numbers read or scanned from one part of the form is different, then the spreadsheet indicates that the form number match is "BAD". If all of the numbers read or scanned from all the parts of the form are the same, then the spreadsheet indicates that the form number match is "GOOD".

In a preferred embodiment, the form has an eight digit number with the ninth digit being a check digit. To validate the check digit, the check digit is first stripped out of the number scanned. Then the spreadsheet calculates the actual check digit and makes a comparison with the number scanned. The check digit may be calculated using any known method. One known method, for example, is a Modulus seven DR calculation utilizing a zero to six check digit sequence. The check digit is determined by first dividing the consecutive form number (without the check digit) by seven and then matching the unique remainder with a number (zero through six) in a look-up table or chart. If a match exists (on both the numbers on each part and the check digit), then this is indicated as a "Good" read on the spreadsheet. Otherwise the spreadsheet will indicate "Bad" if any one or both of these conditions are false.

Advantageously, the system and method of the present invention fool proofs the number check process which is currently a manual process and subject to operator error. The scanning operation focuses attention to the required check and triggers a warning if an error is detected. The summary spreadsheet is then used in the Quality Assurance process to account for all sequential stops and starts in the manufacturing process.

Another advantage of the present invention is that the data collected by the system of the present invention may be a permanent Quality Assurance record tool and can be used as historical information for the manufacturing process.

Although the invention has been described with particular reference to certain preferred embodiments thereof, variations and modifications of the present invention can be effected within the spirit and scope of the following claims.

What is claimed is:

1. A method of automating data capture of a form number on multiple parts of a multi-part form batch, comprising the steps of:

a) optically scanning, using a handheld optical reader, only a form number on a first part of each of a plurality of multi-part forms without capturing a video camera quality image of said form number;

b) recording said form number on the first part of each of said plurality of multi-part forms;

c) repeating steps a) and b) using the same handheld optical reader for each part of said plurality of multi-part forms;

d) comparing said form number recorded for each part of each of said plurality of multi-part forms and determining whether each part of said multi-part form has the same form number; and e) indicating whether each multi-part form has the same form number on each part.

2. The method of claim 1 wherein step e further comprises:

indicating that a multi-part form is "GOOD" if each part of said multi-part form has the same form number and indicating that a multi-part form is "BAD" if each part of said multi-part form does not have the same form number.

3. The method of claim 1 wherein said form number includes a check digit.

4. The method of claim 3 wherein step e further comprises:

indicating that a multi-part form is "GOOD" if each part of said multi-part form has the same form number and the same check digit and indicating that a multi-part form is "BAD" if each part of said multi-part form does not have the same form number or the same check digit.

5. The method of claim 1 wherein said form number is recorded in a spreadsheet.

6. The method of claim 1 wherein a warning is automatically triggered if each multi-part form of the same form does not have the same form number on each part.

7. A method of automating data capture of a non-OCR form number on multiple parts of a multi-part form batch, comprising the steps of:

a) optically scanning, using a handheld optical reader, only a non-OCR form number on a first part of each of a plurality of multi-part forms without capturing a video camera quality image of said form number;

b) recording said non-OCR form number on the first part of each of said plurality of multi-part forms;

c) repeating steps a) and b) using the same handheld optical reader for each part of said plurality of multi-part forms;

d) comparing said non-OCR form number recorded for each part of each of said plurality of multi-part forms and determining whether each part of said multi-part form has the same non-OCR form number; and e) indicating whether each multi-part form has the same non-OCR form number on each part.

* * * * *